May 23, 1939.  C. A. SCOGLAND ET AL  2,159,606
FISH BAIT
Filed June 28, 1937
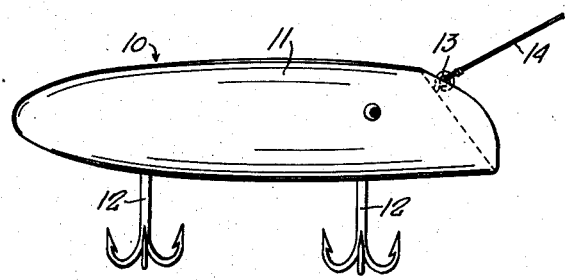
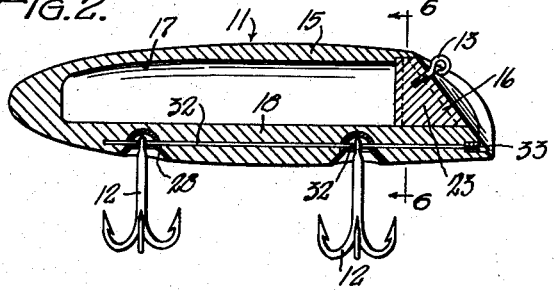
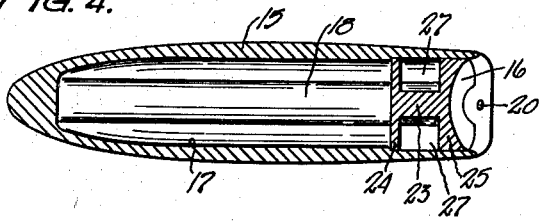
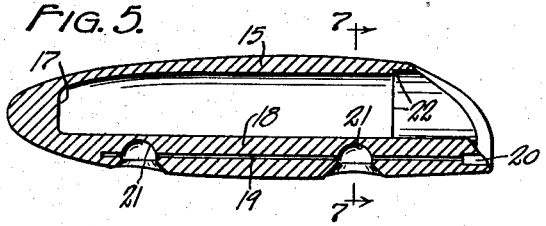
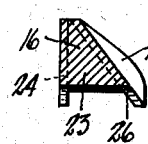
CHARLES A. SCOGLAND.
PHILIP H. SANDERS.
INVENTORS.
BY
Altsch & Knoblock.
ATTORNEYS.

Patented May 23, 1939

2,159,606

UNITED STATES PATENT OFFICE 2,159,606

FISH BAIT

Charles A. Scogland and Philip H. Sanders, South Bend, Ind., assignors to South Bend Bait Company, South Bend, Ind., a corporation of Indiana Application June 28, 1937, Serial No. 150,686

7 Claims. (Cl. 43—46)

This invention relates to improvements in fish baits, and has for its primary object to provide a bait having an improved construction of hollow body formed of molded material.

A further object is to provide a fish bait having a hollow body provided with a novel sealed head construction.

A further object is to provide a fish bait having a hollow body with a configured head sealing said body and cooperating therewith to form supplemental sealed chambers.

A further object is to provide a fish bait having a hollow body and a configured sealing head therefor, said body and head being constructed of molded material shaped and cooperating to maintain the body within proper limits as to weight.

A further object is to provide a fish bait with novel hook mounting means.

A further object is to provide a fish bait of molded material having a recess for the reception of the eye of a hook, and a member lining said recess and held to place by the means for pivoting said hook.

A further object is to provide a fish bait having a molded body open at one end, and a head sealing said end and operatively positioned by the shape of said body.

Other objects will be apparent from the description and the appended claims.

In the drawing:

Fig. 1 is a view of the fish bait in side elevation.

Fig. 2 is a longitudinal vertical sectional view of the fish bait taken on line 2—2 of Fig. 3.

Fig. 3 is a view of the fish bait in front elevation.

Fig. 4 is a longitudinal horizontal sectional view taken on line 4—4 of Fig. 3.

Fig. 5 is a longitudinal vertical sectional view similar to Fig. 2 and illustrating the main portion of the bait body.

Fig. 6 is a transverse sectional view taken on line 6—6 of Fig. 2.

Fig. 7 is a transverse sectional view taken on line 7—7 of Fig. 5.

Fig. 8 is a longitudinal vertical sectional view of the head of the bait body.

Fig. 9 is a perspective view, with parts in section, illustrating the cup-shaped member lining the body recesses at the hook mounting thereof.

Referring to the drawing, which illustrates one embodiment of my invention, the numeral 10 designates a fish bait having an elongated body 11 which carries hooks 12 and is provided with means 13 for attachment of a line 14.

The body 11 is of the "cigar" shaped type conventional in the art, and is preferably formed in two parts, a main portion 15 and a head 16. These parts are preferably formed of a suitable molded plastic material, such as a synthetic resin or the like. Main body portion 15 extends the full length of the bait and is open at one end to receive head 16 therein. The cavity 17 of body portion 15 is preferably of generally circular cross sectional shape interrupted by a thickened portion 18 of the wall of the bait body at the lower side thereof and extending the full length of said cavity. A longitudinally extending bore 19 of small diameter is formed in wall portion 18. The bore 19 communicates with an enlarged coaxial bore 20 at its forward end, said bore 20 opening at the front edge of the body. The rear end of bore 19 terminates forwardly of the rear of the bait body. One or more recesses 21 are formed in wall portion 18, said recesses being closed at their inner ends and intersecting the bore 19 to communicate therewith, the rearmost recess preferably being forwardly spaced from the rear end of bore 19 and the foremost recess preferably being rearwardly spaced from bore 20. The recesses each preferably comprise an outer portion of frusto-conical shape and an inner substantially semi-spherical portion, the bore 19 preferably intersecting said recesses at a point substantially mid-way of the depth thereof. Cavity 17 of the body portion is preferably slightly enlarged at the forward end of said body portion to provide an annular shoulder 22 interrupted by portion 18.

The head 16 is preferably of substantially I-shape in longitudinal horizontal section as best illustrated in Fig. 4, and is of integral molded construction. The head 16 preferably comprises a central longitudinal vertical web portion 23, a rear circular flange 24 perpendicular to web 23, and a front inclined flange portion 25 positioned at an angle to both the web and the rear flange. The head parts are all recessed at 26 to conform to the contour of wall portion 18. The flanges 24 and 25 both fit closely within the front enlarged portion of cavity 17, with rear flange 24 seating against shoulder 22. Suitable cement is employed to secure the head 16 in operative relation within the cavity of body portion 15, said cement at the same time serving to seal the joints between the parts. By this construction the bait is rendered water-tight so that a plurality of airpockets or compartments are formed therein, namely the main cavity of the body and complementary pockets 27, one on each side of web 23, defined by said web, flanges 24 and 25, and the forward portion of the wall of the body portion 15. The head 16 and front edge of body 15 may be configured in any desired shape as by the use of any suitable shaping means after the bait has been assembled. The line attaching member 14 is preferably secured to head 16 to extend into web 23 thereof.

In each of the recesses 21 is fitted an inverted cup-shaped member 28 of a shape complementary thereto and preferably formed of metal; said member being here illustrated as shaped to comprise a central semi-spherical portion 29 and a frusto-conical skirt portion 30. Opposed holes 31 are formed in member 28 intermediate the height thereof to register with bore 19 when said member is seated in recess 21. A wire 32 slidably fits in bore 19 of the body and passes through openings 31 of member 28, and the eye of hook 12 is threaded on said wire when the parts are assembled. The wire then serves to form a pivot mounting for the hook, the member 28 being of sufficient size to permit the hook eye to swing and pivot therein; and the wire also serves to secure the member 28 to place in fixed position in the body recess 21. A suitable self-tapping set screw 33 is tapped in bore 20 and thus locks wire 32 against displacement.

It will be seen that by this construction a bait of desired weight may be accurately obtained, the wall thickness of the body determinig the weight thereof for any given size and design of lure whose weight must comply with set standards. The bait body being of the same size and weight as a conventional wood bait, is buoyant. The buoyancy is insured by the cemented joint between head and body portion, and by the water-impervious character of the plastic material from which the body is molded. The construction of the head as described forms a solid sealed head arrangement adapted to withstand stress when properly cemented; and at the same time the pockets 27 prevent an objectionable concentration of weight as might result from a solid head of equal strength and sealing or joint area. Also, the provision of peripheral groove 26 in the head seating on rib or enlargement 18, locks the head against rotation when being assembled and cemented.

The hook mounting is simple and involves a minimum of parts. Also, assembly or connection of the hooks requires but a minimum amount of time. The construction accommodates rapid change or replacement of hooks, since it is only necessary to remove screw 33 and slide wire 32 out of bore 19 to disassemble the hook mounting arrangement. The screw 33 does not take any of the stress incident to playing and landing a fish, and, consequently, need only be sufficient to prevent longitudinal sliding of the wire in the bore. Likewise, the member 28 takes no stress, but serves only as a bearing or lining to prevent wear of the plastic body adjacent the recess incident to the movement and rubbing of the hook thereagainst.

We claim:

1. A fish bait body comprising an elongated hollow molded portion open at one end, and a head fitting in said hollow portion at said open end, said head comprising a pair of closure plate portions within the cavity of said hollow portion, and a web rigidly interconnecting said plates.

2. A fish bait body comprising a hollow elongated body portion open at one end, and a head cemented in said open end and comprising inner and outer closure portions and an interconnecting portion whereby a cavity is formed at said head defined by a portion of the side of the elongated body portion and the closure portions of the head.

3. A fish bait body comprising a hollow elongated portion open at one end and having a shoulder adjacent said open end, a head secured in said hollow portion and comprising an inner closure portion seating against said shoulder, an outer closure portion, and a web between said closure portions, said head and hollow portions cooperating to provide complementary cavities divided by said web.

4. A fish bait body comprising a hollow elongated portion having an open end and provided with a longitudinal rib projecting interiorly thereof and an interior shoulder adjacent said end, and a head having an outer face forming a continuation of the edge of the open end of the body secured in the open end of said hollow portion against said shoulder and having a longitudinal groove seating on said rib.

5. A fish bait body comprising a hollow, elongated molded portion open at one end and provided with an interiorly projecting longitudinal rib, and a configured molded head fitting in said open end, said head including interconnected spaced closure portions each having a longitudinal groove seating on said rib and peripherally cemented to said hollow portion.

6. A fish bait body comprising a hollow elongated body portion having an open ended cavity of irregular cross-sectional configuration, and a head fitting in the open end of said hollow portion, said head comprising an inner transverse closure portion and an outer inclined closure portion, each fitting tightly in said cavity and peripherally cemented therein, the outer closure cooperating with the leading edge of said hollow portion to provide a continuous diving face.

7. A fish bait body comprising a hollow body portion open at one end, and a head of substantially H-shape in longitudinal section including inner and outer closures each peripherally cemented in said open end to provide a sealed cavity at the head of the bait body.

CHARLES A. SCOGLAND.
PHILIP H. SANDERS.